United States Patent [19]

Carey

[11] Patent Number: 5,660,086

[45] Date of Patent: Aug. 26, 1997

[54] CONNECTING ROD

[76] Inventor: Charles Carey, Via Castellani 31, 10060 Campiglione (TO), Italy

[21] Appl. No.: 558,706

[22] Filed: Nov. 16, 1995

[30] Foreign Application Priority Data

Nov. 17, 1994 [GB] United Kingdom ............... 9423196

[51] Int. Cl.$^6$ .................................................. G05G 1/00
[52] U.S. Cl. ................ 74/579 E; 74/579 R; 123/90.61; 403/344; 29/888.09
[58] Field of Search ................... 74/579 R, 579 E; 123/90.61; 29/888.09; 403/344

[56] References Cited

U.S. PATENT DOCUMENTS

| | | | |
|---|---|---|---|
| 3,889,553 | 6/1975 | Ballheimer | 74/579 R |
| 4,827,795 | 5/1989 | Machida et al. | 74/579 E |
| 4,856,366 | 8/1989 | Nikolaus | 74/579 E |
| 5,109,605 | 5/1992 | Hoag et al. | 29/888.09 |

FOREIGN PATENT DOCUMENTS

| | | | |
|---|---|---|---|
| 746785 | 6/1933 | France | 74/579 E |
| 1067388 | 6/1954 | France | 74/579 E |
| 1001544 | 1/1957 | Germany | 74/579 R |
| 1210263 | 2/1966 | Germany | 74/579 E |
| 875417 | 8/1961 | United Kingdom | 74/579 E |
| 898268 | 6/1962 | United Kingdom | 74/579 E |
| 981446 | 1/1965 | United Kingdom | 74/579 E |
| 1369948 | 10/1974 | United Kingdom | 74/579 E |

*Primary Examiner*—Vinh T. Luong
*Attorney, Agent, or Firm*—Larson & Taylor

[57] ABSTRACT

A connecting-rod has the axes (16) of the cap screws, or bolts, (4) inclined to each other. The big end housing (3,2) is of reduced width and has protruding bearing shells (11). The stem has a cross section of minimum perimeter in the central portion.

11 Claims, 2 Drawing Sheets

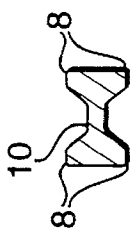
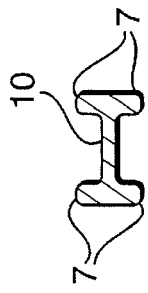
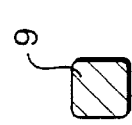
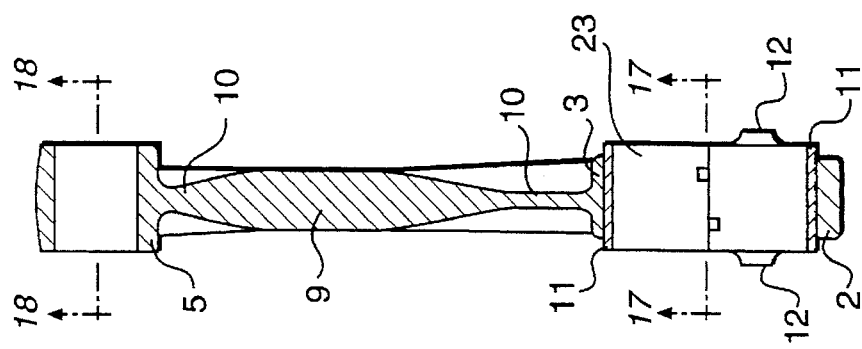
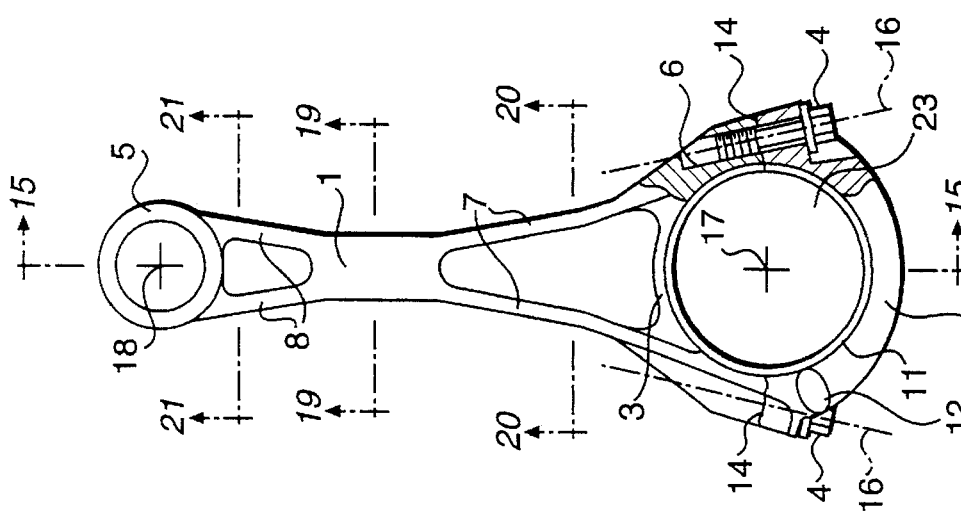

CONNECTING ROD

FIELD OF THE INVENTION

This invention relates to a connecting-rod, in particular a connecting-rod for internal-combustion piston engines.

BACKGROUND OF THE INVENTION

A known connecting-rod comprises a main body and a cap both being held together with bolts or screws and forming an opening in which are fitted bearing shells and in which pass a crankpin. The joining surfaces between the main body and cap are either machined or fractured and lie in planes substantially perpendicular to the axis of the bolt or screw which passes through the respective surface. The main body comprises a stem which connects an opening at one end, the small connecting-rod eye, to part of an opening at the other end, the big end, the remaining part of this opening being formed in the cap, and this stem has ribs, either joined with a web or otherwise, which connect the two openings. The bearing shells are held in the opening by means of a radial pressure due to an interference between the outer surface of the bearing shell and the inner surface of the opening, the inner surface of the opening extending in a direction parallel to the crankpin axis over a greater amount than the bearing shells.

SUMMARY OF THE INVENTION

This invention seeks to lighten the connecting-rod particularly in the region of the opening formed by the main body and cap by inclining the axes of the bolts or screws to reduce the length of each bolt or screw and their surrounding housing and to result in a more favorable stress distribution between the bolt and ribs in the stem of the main body particularly with regard to the bending stresses in the bolt, and also to reduce the width of the opening in the direction of the crankpin axis such that a substantial amount of the bearing shells inserted in the opening remain nearly flush, flush or proud of the opening and with one or more raised portions that serve to guide the connecting rod between the crankpin side faces on the crankshaft. The connecting-rod is preferably made of two pieces, a cap and main body joined together with preferably two screws or bolts. The main body and cap are preferably constructed of a substantially metal material, cast, forged or sintered.

According to a first aspect of the present invention there is provided a connecting-rod which has the bolts or screws that attach the connecting rod cap to the main body of the connecting-rod to have their extended longitudinal mid-axes so as to approach one another in the direction of the small connecting-rod eye, preferably passing inside this opening, and to have the stem of the main body so formed that the projected axes of the bolts or screws pass along, near, or parallel to the ribs in the stem for a substantial part of their length preferably each rib having its outside surface to lie less than one nominal thread diameter of the screw or bolt, or more preferably less than three quarters, or even more preferably one half the said diameter from the projected axis of said screw or bolt for a distance of at least half the length of the stem as measured along the connecting-rod axis, from the end which is connected to the big end opening, the said length of stem being defined as the minimum distance along the connecting-rod axis between the vertex of the big end opening bore surface and the vertex of the little eye bore surface, and for the same outer surface of each rib to not cross the projected axis of the screw and bolt which lies on the same side of the connecting-rod axis as said rib such that it is greater than one half the nominal thread diameter distant from the said axis, this condition to be met over a distance of at least half the stem length as measured along the connecting-rod axis. In addition the inclination of the bolt or screw axis to the axis passing through the centers of each opening permits the shortening of the bolt or screw, particularly that part which passes through the cap such that the length of the screw shank along its mid-axis between the underhead or not and a plane passing perpendicular to the connecting-rod axis and containing the axis of the cylindrical big end opening where all or the greater part of the said screw head or nut lies on the cap side of this plane, is less than one and a quarter or preferably one or even more preferably three quarter diameters of the nominal screw thread diameter while having the axis of the screw to pass a minimum distance equal or less than 85% of the screw or bolt thread diameter from the bore surface of the big end opening. To maintain sufficient strength and rigidity in the cap it is preferred to make provision for side ribs which partly or fully enclose each screw head or nut, said ribs preferably having a height measured perpendicular to the cap surface that abuts the screw underhead or not in a plane that lies parallel to the screw axis a distance of one half the nominal thread diameter from this axis in a direction towards the big end opening bore said plane being also perpendicular to the plane containing the screw axes, of at least one nominal thread diameter. If the inclination of the axis of the screw to the axis passing between both openings in the connecting-rod is small then lateral movement of the cap can be resisted by frictional forces between the two surfaces in addition to any cap location provided by dowel pins or the screws themselves, however if the inclination is great, typically more than ten degrees, the lateral forces may be large and fracture split main body and cap will be preferable in resisting lateral movement between the contacting surfaces due to the multitude of interlocking surfaces in the fracture plane. This method also avoids expensive machining of the joint faces between the main body and cap even when such faces are preferably machined to be a plane surface without steps or serrations. The joining plane of each screw or bolt, as defined as the plane lying on average equidistant from joint surfaces either side of this plane, should preferably lie within twenty degrees or even more preferably five degrees of perpendicularity to the said screw or bolt axis.

A second aspect of the invention provides the stem connecting the small connecting-rod eye opening to the big end opening to have a cross-section transverse to the plane of the rod having a smaller perimeter in a central portion of the stem than in a portion near each connecting-rod eye opening, resulting in a section in the plane containing the two connecting-rod eye axes which is thicker in the central portion of the stem diminishing in the direction of both connecting-rod eye openings, thickness being taken in a direction parallel to the connecting-rod eye axes. A central portion of the stem is defined as that which is greater than one quarter of the distance between connecting-rod eye axes from oft connecting-rod eye axes. Such an arrangement allows the force flux in the lower part of one rib to be transferred to the upper part of the opposite rib without excessive bending stresses in each rib and thereby improving the force distribution between the little eye housing and the inclined bolt or screw, having their projected axes to pass preferably within two nominal thread diameters from the outer surface of the rib that lies on the opposite side of the connecting-rod axis from the screw whose axis is being projected, for a distance of at least one quarter the stem length as measured along the connecting-rod axis.

A third aspect of the invention provides that the length of the bore walls of the big end opening, in the direction of the axis of the big end opening, are such that the edge of the arcuate shell bearing or bearings that are fitted inside the big end opening and which have a radial thickness which is typically less than 5% of the diameter of the big end opening, remain less than 60% of the radial nominal thickness of the bearing from the edge, or preferably flush, or more preferably extend beyond the bore walls for a substantial part of their circumference preferably at least 40% of the circumference. In this way the bearing shell outer surface may be free from contact and unsupported by the connecting-rod big end opening over part of its load carrying portion thus relying on the strength of its own shell, which is typically made from steel with a bearing overlay, to resist the bearing loads between the crankpin, bearing shell, and intermediate oil film. Such bearing shells being typically produced in two halves each half fitting into the main body housing and cap housing respectively, their arcuate from consisting of one outer surface which contacts the respective housing bore walls having an interference between these surfaces to ensure their location and utilizing small tangs to locate their position in the axial direction of the housing bore, each tang fitting into a corresponding slot in the cap and main housing bore walls. In addition should the connecting-rod be guided in the axial direction of the crankpin by contact, intermittent or otherwise, with radial surfaces on the crankshaft, then one or more raised surfaces can be provided on the sides of the connecting-rod such that they prevent contact between the bearing shell and the radial surfaces on the crankshaft, thereby providing the necessary axial guidance. The raised pads can also conveniently coincide with the ribs on the cap which enclose the screw heads. In the case of two or more connecting-rods being mounted on the same crankpin then raised pads can be arranged to come into contact with each other on respectively adjacent connecting-rods.

BRIEF DESCRIPTION OF THE DRAWINGS

Embodiments of the invention are illustrated diagrammatically in the drawings in which;

FIG. 1 shows a side view of a connecting-rod.

FIG. 2 shows a longitudinal section of a connecting-rod together with the big end connecting-rod eye shell bearings, taken generally along line 15—15 of FIG. 1.

FIGS. 3,4,5 show stem sections, taken generally along line 19—19, 20—20, and 21—21,respectively.

DESCRIPTION OF THE PREFERRED EMBODIMENTS

Figure 9:
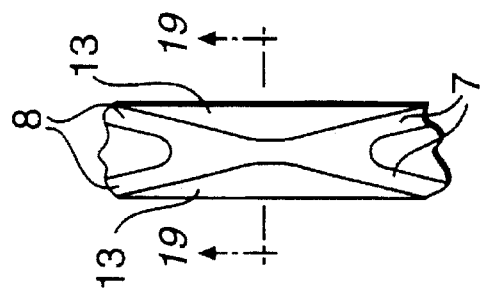
FIG. 9 is a fragmentary side elevational view of yet another embodiment of the stem.

Referring to the drawing, the connecting-rod comprises a main body 1 which has a small connecting-rod eye 5 and a part of a large connecting-rod eye, the big end, 3 which is completed by a cap 2. The cap 2 is attached to the main body 1 by means of elongate fasteners such as screws 4, as shown, or bolts with nuts (not shown), whose extended longitudinal mid-axes 16 approach one another in the direction of the small connecting-rod eye and which pass near and parallel to a rib for a substantial portion of the length of the stem. The holes 6, in which pass the screws, may be closed or part closed at one end. The mating surfaces 14 between the main body 1 and cap 2 may be machined or preferably fractured and may have the direction of their planes of contact at various angles to the mid-axis of each screw. Although not shown the heads of the screws or nuts on the bolts may be sufficiently sunk in the cap between the ribs 12, such that the length of the screw shank along its axis 16 between the underhead surface or nut surface that abuts the cap and the plane perpendicular to the axis 15 and in which lies the axis 17 may be less than one and a quarter or more preferably one or even more preferably three quarter nominal thread diameters of the screw or bolt, while having the axis of the screw 16 passing less than or equal to 85% of the thread diameter from the bore surface of the big end opening.

An arcuate shell bearing or bearings 11 is held within the large connecting-rod eye by means of the cap 2 and housing 3 in the main body 1. The lateral length of the bore walls of the big end opening O, the direction of the axis 17 of the big end opening, is such that the edges of the arcuate bearing shells, having typically a radial thickness less than 5% of the diameter of the big end opening 23 (also referred to as the big end connecting-rod eye), remain less than 60% from the edge, or preferably flush or more preferably extend beyond the bore walls for a substantial part of their circumference, preferably more than 40% of the circumference. Where the axial guidance of the connecting-rod in the direction of the longitudinal axis 17 of the big end opening 23 is controlled by contact, intermittent or otherwise, with the crank shaft, a laterally extending boss or bosses 12 of the large connecting-rod eye housing are provided as shown in FIG. 1 and FIG. 2 and these may conveniently coincide with the ribs enclosing the screw head or nuts on the cap as shown.

Also shown in FIG. 1 are two ribs 7 which comprises a part of the stem of the main body and whose outer sides adjoin the outer contours of the big end and who converge upon each other at some point between the connecting-rod eyes and then diverge as ribs 8 to adjoin the small connecting rod eye, thereby having a section 15 in the plane containing the two axes 17 and 18 as shown in FIG. 2 where a thick central portion of the stem 9 diminishes to a thinner part 10 in each direction towards both connecting-rod eye housings 3 and 5. FIG. 3 shows the section 19 in the central portion of the stem having a shorter perimeter than in sections 20 and 21 nearer each connecting-rod eye as shown in FIG. 4 and FIG. 5 respectively. Thus the projected axes of the screws 16 are seen to pass near and almost parallel to the ribs 7 and 8 for a substantial part of the length of the stem.

Figure 6:
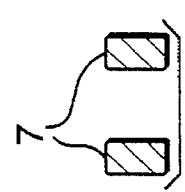
FIG. 6 shows an alternative stem cross section to that of FIG. 4.

FIG. 6 shows an alternative to sections 20 and/or 21 where the stem is comprised of two struts without a connecting central portion 10.

Figure 7:
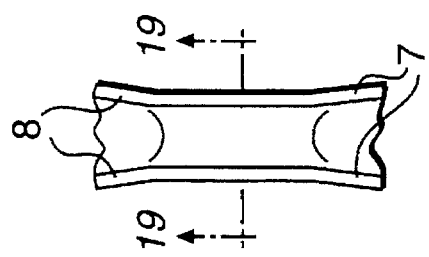
FIG. 7 is a fragmentary side elevational view of an alternative embodiment of the stem.
Figure 8:
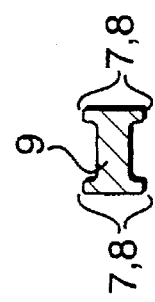
FIG. 8 is a section taken generally along line 19—19 of FIG. 7.

FIGS. 7 and 8 show another embodiment of the central portion of the stem where the side ribs 7 and 8 of the stem remain defined but a substantially thick portion 9 remains between them.

Figure 10:
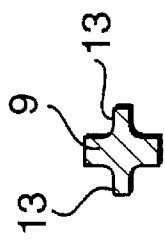
FIG. 10 is a section taken generally along line 19—19 of FIG. 9.

FIGS. 9 and 10 show another embodiment of the stem where an outer fin or fins 13 exist over part or all of the converging, diverging ribs 7 and 8.

I claim:

1. A connecting-rod assembly comprising an arcuate connecting-rod cap, a main body having a relatively small connecting rod eye at one end thereof and an opposite end having an arcuate shape, and elongate fasteners for attaching said cap to said opposite end of said main body so as to define a big end opening having a central axis, said fasteners being received in holes in bore walls defining said big end opening, said fasteners having a thread diameter and having longitudinal axes which are angled so as to approach one another in the direction of the small connecting-rod eye, the spacing of the longitudinal axes of said fasteners from the closest adjacent surface of the big end opening being less than 85% of the thread diameter of the fastener, said holes having an entrance surface and the length of said fasteners along the longitudinal axes between the entrance surface of said holes and a plane perpendicular to the longitudinal axis of the main body and passing through the central axis of the big end opening being less one and a quarter times said thread diameter, and said bore walls including ribs formed therein adjacent to said holes.

2. A connecting-rod assembly according to claim 1, wherein said length is less than said thread diameter.

3. A connecting-rod assembly according to claim 2, wherein said length is less than three quarters of said thread diameter.

4. A connecting-rod assembly according to claim 3, said opposite end of said main body and said arcuate cap are of single piece construction and solely define said big end opening, and said opposite end and said cap are joined together along a mating surfaces which define a plurality of contact planes of different angles with respect to the longitudinal axes of the respective fasteners.

5. A connecting rod assembly according to claim 1 further comprising at least one arcuate shell bearing fitted in said big end opening.

6. A connecting rod assembly according to claim 5 wherein said shell bearing is flush with said big end opening.

7. A connecting rod assembly according to claim 5 wherein an edge of said shell bearing extends outwardly beyond said big end opening in the direction of the central axis thereof.

8. A connecting rod assembly according to claim 7 wherein said shell bearing extends around at least 40% of the circumference of said big-end opening.

9. A connecting-rod assembly comprising ah arcuate connecting-rod cap, a main body having a stem interconnecting a small connecting rod eye at one end thereof and an arcuate shaped opposite end, and elongate fasteners for attaching said cap to said opposite end of said main body so as to define a big end connecting-rod eye having a central axis, said fasteners being received in holes in bore walls defining said big end connecting-rod eye, said fasteners having a thread diameter and having longitudinal axes which are angled so as to approach one another in the direction of the small connecting-rod eye, said stem including ribs and having a cross-section transverse to the plane of the rod of a smaller perimeter in a central portion of the stem than that of a portion of the stem adjacent to each of said connecting-rod eyes such that a portion of the stem in the plane containing the axes of said connecting-rod eyes is thicker in the central portion of the stem and diminishes in directions towards both of said connecting-rod eyes, and such that the ribs of a substantial portion of the stem are located near and extend substantially parallel to the projected axes of the fasteners.

10. A connecting-rod according to claim 9, wherein the ribs converge and diverge along the length of the stem.

11. A connecting-rod assembly comprising an arcuate connecting-rod cap, a main body having a stem interconnecting small eye connecting rod eye at one end thereof and an arcuate shaped opposite end, and elongate fasteners for attaching said cap to said opposite end of said main body so as to define a big end connecting-rod eye having a central axis, and at least one arcuate shell bearing fitted in said big end connecting-rod eye and having an edge and a radial thickness, the length of the bore walls of the big end connecting-rod eye, in the direction of the axis of the big end connecting-rod eye, being such that the edge of the arcuate shell bearing extends beyond the bore walls for at least 40% of the circumference of the bore walls, and said bore walls including raised pads for guidance of the connecting-rod in the direction of the axis of the big end connecting-rod eye.

* * * * *